2 Sheets—Sheet 1.

W. E. SAWYER.
ELECTRIC ENGINEERING AND LIGHTING APPARATUS AND SYSTEM.

No. 194,111. Patented Aug. 14, 1877.

Witnesses.
Chandler Hall
James G. Smith

Inventor.
William Edward Sawyer

N. PETERS, PHOTO-LITHOGRAPHER, WASHINGTON, D. C.

2 Sheets—Sheet 2.
W. E. SAWYER.
ELECTRIC ENGINEERING AND LIGHTING APPARATUS AND SYSTEM.
No. 194,111. Patented Aug. 14, 1877.
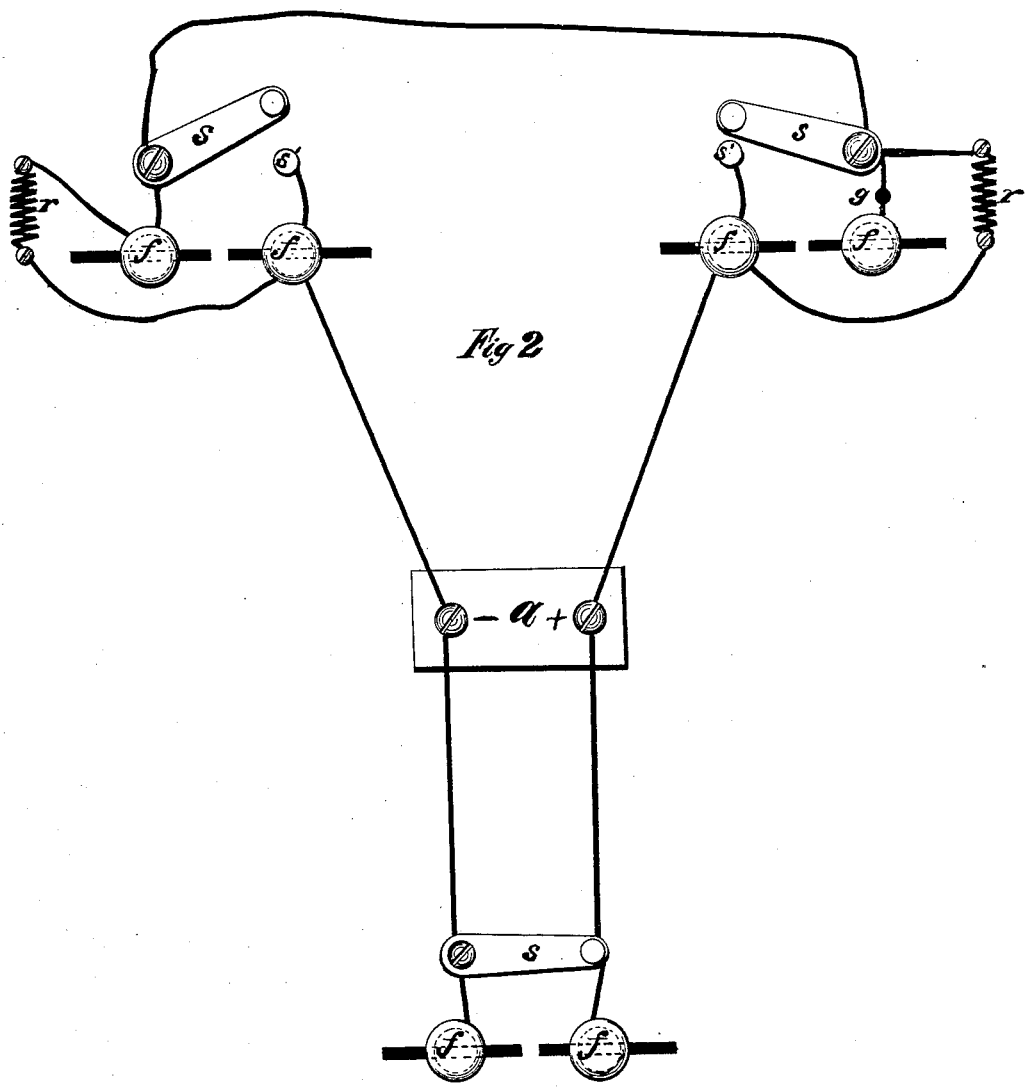
Witnesses.
Chandler Hall
James G. Smith
Inventor.
William Edward Sawyer

UNITED STATES PATENT OFFICE.

WILLIAM E. SAWYER, OF NEW YORK, N. Y.

IMPROVEMENT IN ELECTRIC ENGINEERING AND LIGHTING APPARATUS AND SYSTEM.

Specification forming part of Letters Patent No. 194,111, dated August 14, 1877; application filed June 22, 1877.

*To all whom it may concern:*

Be it known that I, WILLIAM EDWARD SAWYER, of the city, county, and State of New York, have invented certain new and useful Improvements in Electric Engineering and Electric Lighting Apparatus and Systems, of which the following is a full, clear, and exact description, reference being had to the drawings accompanying and forming a part of this specification, in which—

Figure 1:
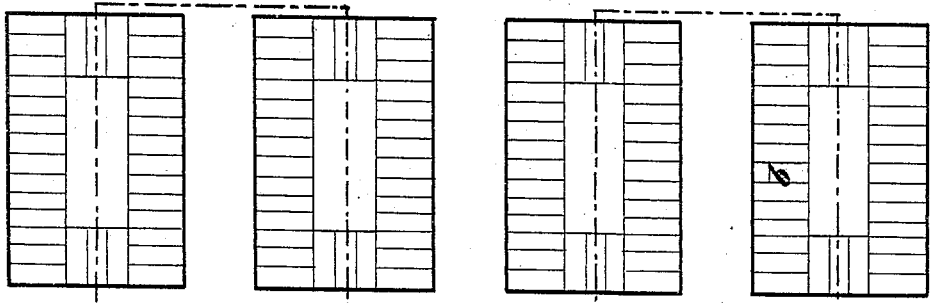
Figure 1:
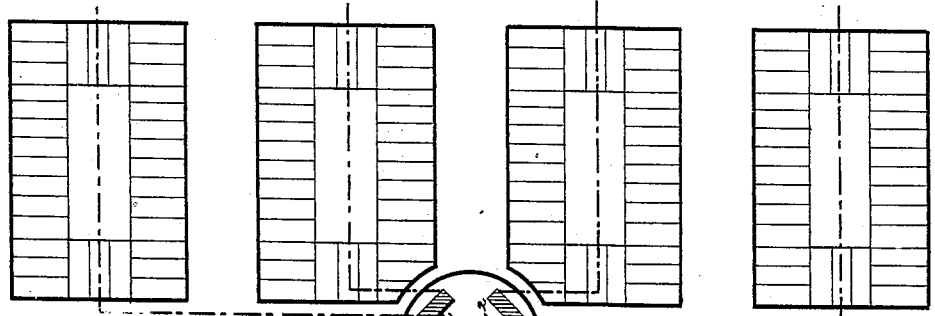
Figure 1:
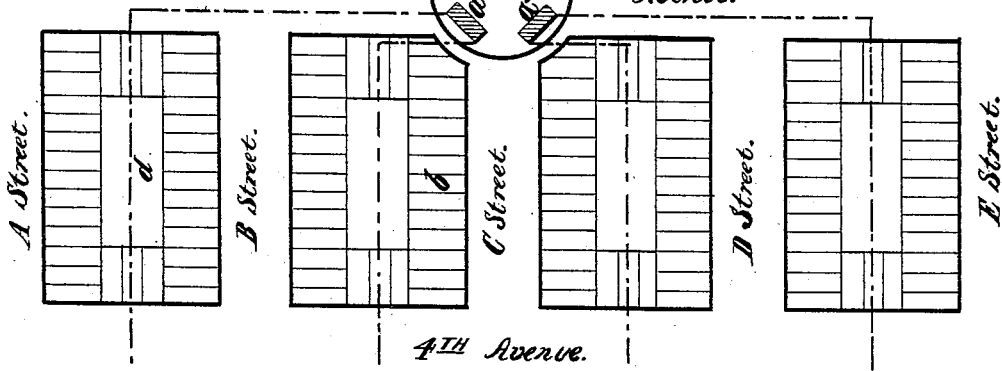
Figure 1:
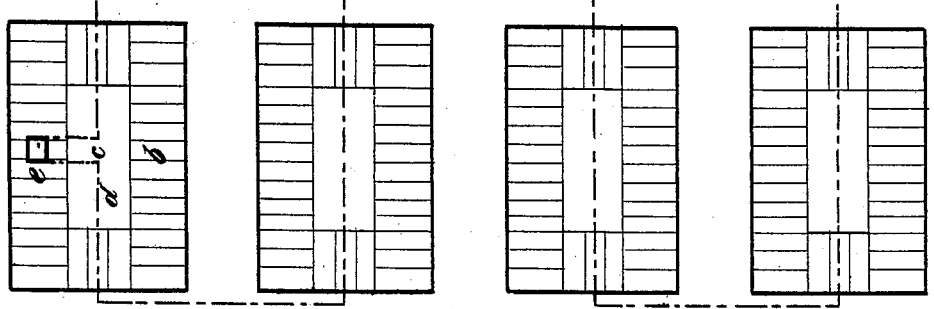

Figure 1 represents the streets and blocks of a city furnished with electric conduits radiating from a central station, and Fig. 2 a form of circuits for use therewith.

The object of my invention is to supply the streets, blocks, or buildings of a town or city in a practicable manner with any desired quantity of electricity for the purposes of electric illumination, electroplating, electric heating, the running of electro-magnetic engines, &c.

I place the generator or generators of electricity in any convenient portion of a locality, whence I carry the necessary conductors over or under ground to the streets, blocks, or buildings in which the electric current is to be utilized.

My generators may be in the form of a galvanic battery, or, what is preferable, magneto-electric machines driven by wind, steam, water, or other power.

In place of electric conductors leading from a central station, I may substitute tubes or pipes through which water or compressed air is carried to a building, there to drive magneto-electric apparatus, &c., for local work.

The advantages of my invention are that it enables householders to obtain a supply of electricity for any purposes without the care and inconvenience attending the maintenance of local galvanic batteries; that it greatly reduces the cost of electricity to consumers; and lastly, that it renders practicable the lighting of buildings by electricity.

In the drawings, Fig. 1, are represented sixteen blocks of a city as supplied from a central station, R, shown for convenience as in the exact center of the square. The number of blocks may be greater or less, as may seem desirable, and the supplying station may be located wherever may seem most practicable. I have shown at R four generators, $a$, $a^1$, $a^2$, and $a^3$. A greater or less number may be employed. The letters $b\ b\ b\ b$ indicate rows of houses. $d\ d$ are areas. The dotted lines indicate the course of the conduits of electricity from each generator. I have shown a single conduit for the supplying of four blocks; but I may employ any number of conduits for the same territory. At $e$ is indicated the electric lamp, electric engine, or other apparatus, the conduit looping thereto from a point, $c$.

I do not limit myself in any way as to the number of generators or number of conduits for any locality or the purpose for which the electricity is used in combination with my central station.

In Fig. 2, $a$ is the generator of electricity in connection with possible branch circuits. $f\,f$ are the electrodes of the electric lamp or other apparatus. $r$ is a resistance in a shunt around these electrodes. $s$ is a switch, and $s'$ its stud, by means of which, when the switch bears on the stud, the current is short-circuited around the electrodes $f\,f$. To let in the current the switch is thrown off; to shut off the flow the switch is thrown on the stud.

It is obvious that the resistance $r$ may be dispensed with, if desired, as the voltaic arc from $f$ to $f$ serves to preserve the continuity of the circuit; but I greatly prefer to use the resistance, by adjusting which I regulate the intensity of the light.

When it is desirable to know the quantity of electricity consumed, I may place a gage, register, or indicator at the point $g$.

The object of my invention is to supply streets and houses with electricity for local use or work, the same as gas or water is supplied to streets and houses at the present day, so that whenever a flow of electricity is desired it is only necessary to open a stop-cock, so to speak, and obtain whatever supply is needed.

For the operation of electric engines the flow of electricity should be either positive or negative, but for electric illumination the flow may consist of alternating positive and negative electricities.

Having thus described my invention, what I claim as such, and desire to secure by Letters Patent, is—

1. In an electric lighting system, a single conductor supplied with electricity, two or more lamps in the circuit of said conductor, and a shunt around each lamp containing a switch.

2. In an electric lighting system, a single conductor supplied with electricity, two or more lamps in the circuit of said conductor, and a shunt around each lamp containing a resistance.

3. In an electric lighting system, a single conductor supplied with electricity, two or more lamps in the circuit of said conductor, and a shunt around each lamp containing an adjustable resistance.

4. In an electric engineering system, a single conductor supplied with electricity, two or more electric engines in the circuit of said conductor, and a shunt around each engine containing a resistance.

5. In an electric engineering system, a single conductor supplied with electricity, two or more electric engines in the circuit of said conductor, and a shunt around each engine containing an adjustable resistance.

6. In an electric engineering and lighting system, a single conductor supplied with electricity, two or more electric engines and electric lamps in the circuit of said conductor, and a shunt around each engine or lamp containing a resistance.

7. In an electric engineering system, a single conductor supplied with electricity, two or more electric engines and electric lamps in the circuit of said conductor, and a shunt around each engine or lamp containing an adjustable resistance.

8. The herein-described system for supplying electricity from a central or otherwise conveniently-located generator, consisting of a single conductor running from said generator to the house or houses to be supplied with electricity, and in each house, or each engine, lamp, or other apparatus to be operated by said electricity, three lines of conductors, one including the switch for throwing the current through the lamp, engine, or other apparatus, another including the apparatus to be operated, and the third consisting of a continuously-closed circuit with a simple or an adjustable resistance for preserving intact the circuit of the main conductor.

9. The herein-described system for supplying electricity from a central or otherwise conveniently-located generator or generators, consisting of a series of conductors running from said generator or generators to the house or houses to be supplied with electricity, and in each house, or each engine, lamp, or other apparatus to be operated by said electricity, three lines of conductors, one including the switch for throwing the current through the lamp, engine, or other apparatus, another including the apparatus to be operated, and the third consisting of a continuously-closed circuit with a simple or an adjustable resistance for preserving intact the circuits of the main conductors.

WILLIAM EDWARD SAWYER.

Witnesses:
JAMES G. SMITH,
JOS. COLLETT.